US009329715B2

(12) United States Patent
Schwarz et al.

(10) Patent No.: US 9,329,715 B2
(45) Date of Patent: May 3, 2016

(54) METHOD AND APPARATUS FOR DIFFERENTIATING TOUCH SCREEN USERS BASED ON TOUCH EVENT ANALYSIS

(71) Applicant: QEEXO, CO., San Jose, CA (US)

(72) Inventors: Julia Schwarz, Pittsburgh, PA (US); Chris Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 37 days.

(21) Appl. No.: 14/483,150

(22) Filed: Sep. 11, 2014

(65) Prior Publication Data

US 2016/0077615 A1    Mar. 17, 2016

(51) Int. Cl.
*G06F 3/041* (2006.01)

(52) U.S. Cl.
CPC ...................................... *G06F 3/041* (2013.01)

(58) Field of Classification Search
CPC ...... G06F 3/0416; G06F 3/0488; G06F 3/041
See application file for complete search history.

(56) References Cited

U.S. PATENT DOCUMENTS

| | | | |
|---|---|---|---|
| 9,013,452 B2 | 4/2015 | Harrison et al. | |
| 9,019,244 B2 | 4/2015 | Harrison | |
| 2005/0083313 A1 | 4/2005 | Hardie-Bick et al. | |
| 2010/0302184 A1* | 12/2010 | East | G06F 3/016 345/173 |
| 2011/0018825 A1 | 1/2011 | Kondo et al. | |
| 2014/0210788 A1 | 7/2014 | Harrison et al. | |
| 2014/0240295 A1 | 8/2014 | Harrison | |
| 2014/0289659 A1 | 9/2014 | Harrison et al. | |

FOREIGN PATENT DOCUMENTS

| | | |
|---|---|---|
| JP | 2004-213312 A | 7/2004 |
| KR | 10-2002-0075283 A | 10/2002 |
| WO | 2006-070044 A1 | 7/2006 |

OTHER PUBLICATIONS

International Search Report and Written Opinion received for PCT Application No. PCT/US2012/060865 mailed on Mar. 29, 2013, 10 pages.

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery; 2; pp. 121-167; 1998.

(Continued)

*Primary Examiner* — Gerald Johnson
(74) *Attorney, Agent, or Firm* — IPV Law Group; David N. Tran

(57) ABSTRACT

Some embodiments of the present invention include a method of differentiating touch screen users based on characterization of features derived from the touch event acoustics and mechanical impact and includes detecting a touch event on a touch sensitive surface, generating a vibro-acoustic waveform signal using at least one sensor detecting such touch event, converting the waveform signal into at least a domain signal, extracting distinguishing features from said domain signal, and classifying said features to associate the features of the domain signal with a particular user.

21 Claims, 4 Drawing Sheets

(56) References Cited

OTHER PUBLICATIONS

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (TABLETOP); pp. 139-146; 2008.
Deyle, Travis, Palinko, Szabolcs, Poole, Erika Shehan, Starner, Thad; Hambone: A Bio-Acoustic Gesture Interface; Proceedings of ISWC, 2007; pp. 1-8, 2007.
Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.
Dietz, Paul, Leigh, Darren; DiamondTouch: A Multi-User Touch Technology; ACM Symposium on User Interface Software & Technology (UIST); pp. 219-226; 2001.
Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.
Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.
Harrison, Chris, Tan, Desney, Morris, Dan; Skinput: Appropriating the Body as an Input Surface; Proceedings of CHI, 2010; pp. 453-462; 2010.
Harrison, Chris, Hudson, Scott; Scratch Input: Creating Large, Inexpensive, Unpowered and Mobile Finger Input Surfaces; Proceedings of UIST, 2008; pp. 205-208; 2008.
Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.
Hinckley, Ken, Song, Hyunyoung; Sensor Synaesthesia: Touch in Motion, and Motion in Touch; Proceedings of CHI, 2011; pp. 801-810; 2011.
Hinckley, Ken, Yatani, Koji, Pahud, Michel, Coddington, Nicole, Rodenhouse, Jenny, Wilson, Andy, Benko, Hrvoje, Buxton, Bill; Pen+Touch=New Tools; Proceedings of UIST, 2010; pp. 27-36; 2010.
Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen+Touch Direct Input; Proceedings of CHI, 2010; pp. 2793-2802; 2010.
Holz, Christian, Baudisch, Patrick; The Generalized Perceived Input Point Model and How to Double Touch Accuracy by Extracting Fingerprints; Proceedings of CHI, 2010; pp. 581-590; 2010.
Kaltenbrunner, Martin, Bencina, Ross; reacTIVision: A Computer-Vision Framework for Table-Based Tangible Interaction; Proceedings of TEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
Mimio; http://www.mimio.com.
Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Leo, Che King; Tracking and Characterizing Knocks Atop Large Interactive Displays; Sensor Review, 25(2); pp. 134-143; 2005.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.

Rekimoto, Jun; SmartSkin: An Infrastructure for Freehand Manipulation on Interactive Surfaces; Proceedings of CHI, 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US2012/060865; mailed Mar. 29, 2013.
Non-Final Office Action—mailed on Mar. 13, 2015—U.S. Appl. No. 13/958,427, filed Mar. 23, 2013, titled: "Capture of Vibro-Acoustic Data Used to Determine Touch Types".
Final Office Action—mailed on Jun. 19, 2015—U.S. Appl. No. 13/958,427, filed Mar. 23, 2013, titled: "Capture of Vibro-Acoustic Data Used to Determine Touch Types".
Non-Final Office Action—mailed on Apr. 6, 2015—U.S. Appl. No. 13/887,711, filed May 6, 2013, titled: "Using Finger Touch Types to Interact With Electronic Devices".
Final Office Action—mailed on Aug. 7, 2015—U.S. Appl. No. 14/191,329, filed Feb. 26, 2014, titled: "Using Capacitive Images for Touch Type Classification".
Non-Final Office Action—mailed on Oct. 1, 2015—U.S. Appl. No. 14/492,604, filed Sep. 22, 2014, titled: "Method and Apparatus for Improving Accuracy of Touch Screen Event Analysis by Use of Edge Classification".
International Search Report and Written Opinion received for PCT Application No. PCT/US2014/049485 mailed on Nov. 17, 2014.
International Search Report and Written Opinion received for PCT Application No. PCT/US2014/033380 mailed on Mar. 13, 2015.
International Search Report and Written Opinion received for PCT Application No. PCT/US2014/034977 mailed on Sep. 18, 2014.
Non-Final Office Action—mailed on Oct. 7, 2015—U.S. Appl. No. 14/495,041, filed Sep. 24, 2014, titled: "Method for Improving Accuracy of Touch Screen Event Analysis by Use of Spatiotemporal Touch Patterns".
Non-Final Office Action—mailed on Oct. 2, 2015—U.S. Appl. No. 14/486,800, filed Sep. 15, 2014, titled: "Method and Apparatus for Resolving Touch Screen Ambiguities".
U.S. Appl. No. 13/849,698, filed Mar. 23, 2013, titled: "Method and System for Activating Different Interactive Functions Using Different Types of Finger Contacts."
U.S. Appl. No. 13/780,494, filed Feb. 28, 2013, titled: "Input Tools Having Viobro-Acoustically Distinct Regions and Computing Device for Use With the Same."
U.S. Appl. No. 13/958,427, filed Aug. 2, 2013, titled: "Capture of Vibro-Acoustic Data Used to Determine Touch Types."
U.S. Appl. No. 14/191,329, filed Feb. 26, 2014, titled: "Using Capacitive Images for Touch Type Classification."
U.S. Appl. No. 13/887,711, filed May 6, 2013, titled: "Using Finger Touch Types to Interact with Electronic Devices."
U.S. Appl. No. 14/492,604, filed Sep. 22, 2014, titled: "Method and Apparatus for Improving Accuracy of Touch Screen Event Analysis by Use of Edge Classification."
U.S. Appl. No. 14/495,041, filed Sep. 24, 2014, titled: "Method for Improving Accuracy of Touch Screen Event Analysis by Use of Spatiotemporal Touch Patterns."
U.S. Appl. No. 14/242,127, filed Apr. 1, 2014, titled: "Method and Apparatus for Classifying Touch Events on a Touch Sensitive Surface."
International Search Report and Written Opinion received for PCT Application No. PCT/US2014/049485 mailed on Nov. 17, 2014, 13 pages.
International Search Report and Written Opinion received for PCT Application No. PCT/US2014/34977 mailed on Sep. 18, 2014, 12 pages.
Non-Final Office Action—mailed on Jun. 24, 2014—U.S. Appl. No. 13/849,698, filed Mar. 23, 2013, titled: "Method and System for Activating Different Interactive Functions Using Different Types of Finger Contacts."
Non-Final Office Action—mailed Oct. 16, 2014—U.S. Appl. No. 13/780,494, filed on Feb. 28, 2013, titled: "Input Tools Having Viobro-Acoustically Distinct Regions and Computing Device for Use With the Same."

* cited by examiner

METHOD AND APPARATUS FOR DIFFERENTIATING TOUCH SCREEN USERS BASED ON TOUCH EVENT ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to the analysis of touch screen mechanical impact features and acoustic features to differentiate between different users.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Various electronic devices today are typically operated by a user interacting with a touch screen. Some such devices, such as touch sensitive computer screens, are designed to be operated by multiple users, normally at different times. Other such devices, such as smart phones, are usually associated with a single user whose privacy could be seriously jeopardized if another user gains unauthorized access to such one-user devices.

With multiple user devices, it is usually necessary to provide an input to the computer to identify the particular user who is operating the system so that appropriate user-related programs are presented for further processing by the correct user.

With single user devices, exposure of detailed information to an unauthorized user would exacerbate the injury to privacy of the authorized user and therefore passwords, fingerprint readers and entry codes are often used to prevent access to the unauthorized user.

Unfortunately, such user ID inputs, passwords, fingerprint reading, entry codes and other such extra ID or security operations, are time-consuming and inconvenient and detract from the pleasure and efficiencies of using such devices.

BRIEF SUMMARY

For some embodiments, methods for differentiating touch screen users includes detecting a touch event from at least one user, generating a vibro-acoustic waveform signal associated with the touch event, converting the vibro-acoustic waveform signal into at least one converted waveform signal different from the vibro-acoustic wave form signal, extracting distinguishing features from the converted waveform signal, and using the extracted distinguishing features to associate the touch event with a particular user.

For some embodiments, apparatus for differentiating touch screen users include a touch sensitive surface configured for detecting a touch event from at least one user, a sensor configured to generate a vibro-acoustic waveform signal in response to occurrence of the touch event, a converter configured to convert the waveform signal into at least one converted wave form signal different from the vibro-acoustic waveform signal, a feature extractor configured for extracting distinguishing features from the converted waveform signal, and a classification unit configured to use the distinguishing features extracted by the extractor to associate the vibro-acoustic waveform signal with a particular user.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
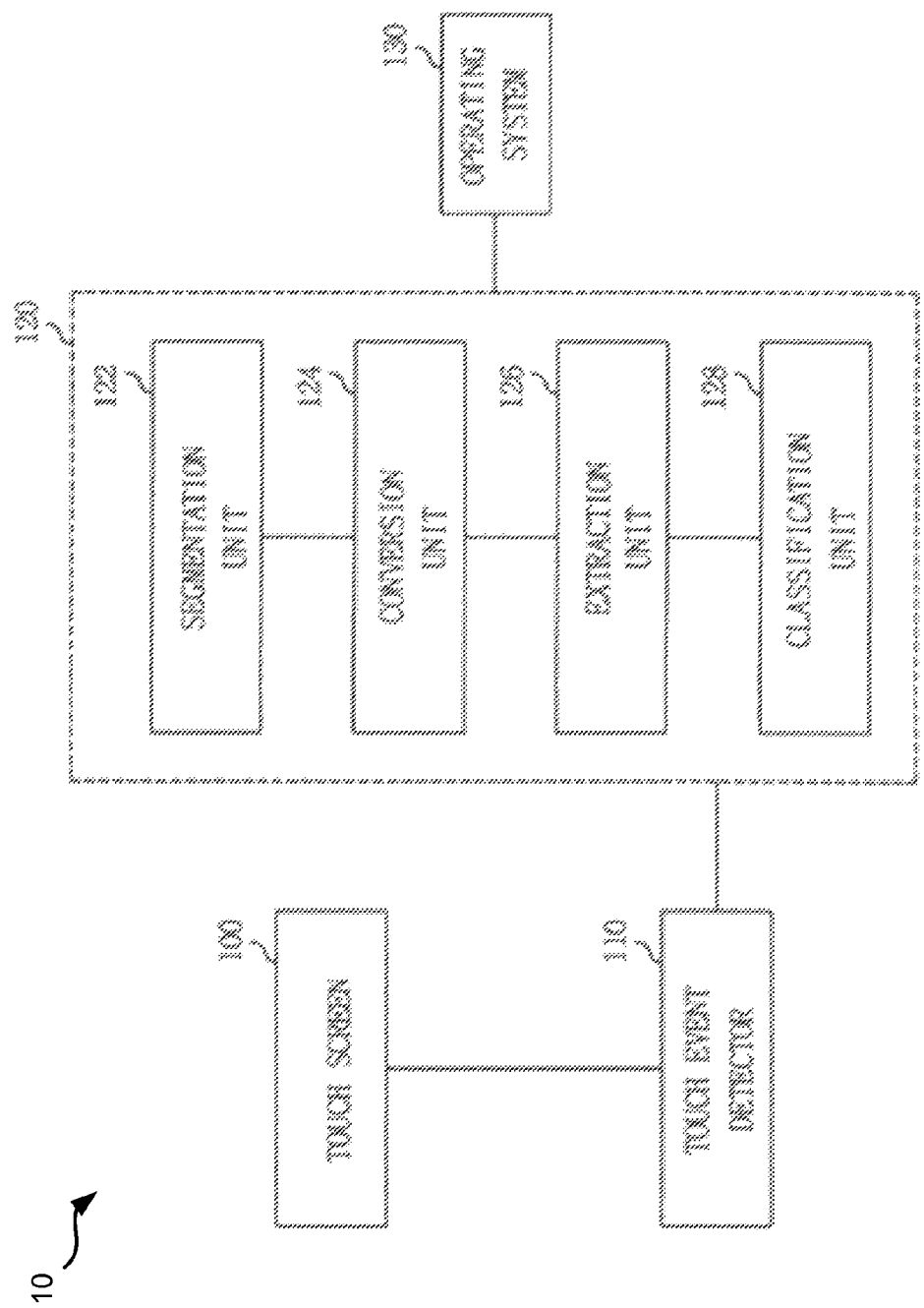
FIG. 1 is a block diagram of a computing system for distinguishing touch screen users based on a classification of vibro-acoustic signals, in accordance with an exemplary embodiment of the invention.

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include methods of differentiating touch screen users based on characterization of features derived from the touch event acoustics and mechanical impact and includes detecting a touch event on a touch sensitive surface, generating a vibro-acoustic waveform signal using at least one sensor detecting such touch event, converting the waveform signal into at least a domain signal, extracting distinguishing features from said domain signal, and classifying said features to associate the features of the domain signal with a particular user.

The disclosed embodiments may include systems to differentiate touch screen users of a touch screen device. The systems may include a processor and one or more stored sequences of instructions which, when executed by the processor, cause the processor to detect a touch event on a touch sensitive surface, generate a vibro-acoustic waveform signal using at least one sensor detecting such touch event, convert the waveform signal into at least a domain signal, extract distinguishing features from said domain signal, and classify said features to associate the features of the domain signal with a particular user.

The disclosed embodiments may include apparatus to differentiate touch screen users of a touch screen device. The apparatus may include a touch sensitive surface for detecting a touch event from at least one user, at least one sensor generating a vibro-acoustic waveform signal from such touch event, a converter for converting the waveform signal into at least a domain signal, a feature extractor for extracting distinguishing features from said domain signal, and a classification unit which uses the distinguishing features of said extractor to associate the features of the domain signal with a particular user.

The disclosed embodiments may include a machine-readable medium carrying one or more sequences of instructions for providing social information, which instructions, when executed by one or more processors, cause the one or more processors to detect a touch event on a touch sensitive surface, generate a vibro-acoustic waveform signal using at least one sensor detecting such touch event, convert the waveform signal into at least a domain signal, extract distinguishing features from said domain signal, and classify said features to associate the features of the domain signal with a particular user. The domain signal may be a time domain signal or a frequency domain signal.

In general, when a user touches a touch screen (i.e., a physical impact) of a computing system equipped with a touch screen (e.g., a smart phone), a mechanical force is applied to the touch screen, resulting in mechanical vibrations that propagate on and through the touch screen, as well as any contacting components (e.g., device chassis, electronics main board, enclosure). These mechanical vibrations may be captured by at least one of a variety of sensors, including impact sensors, vibration sensors, accelerometers, strain gauges, or acoustic sensors such as a condenser microphone, a piezoelectric microphone, MEMS microphone and the like.

Once the vibro-acoustic signal associated with the mechanical vibrations has been captured by a sensor, it can be converted into a series of features, for example: Average acoustic power, Standard Deviation, Variance, Skewness, Kurtosis, Absolute sum, Root Mean Square (RMS), Dispersion, Zero-crossings, Spectral centroid, Spectral density, Linear Prediction-based Cepstral Coefficients (LPCC), Perceptual Linear Prediction (PLP), Cepstral Coefficients Cepstrum Coefficients, Mel-Frequency Cepstral Coefficients (MFCC), Frequency phases (e.g., as generated by an FFT).

Many touch screen technologies are able to digitize several aspects of a touch event, such as the shape, size, capacitance, orientation, pressure, etc. The latter may be used as distinguishing features, or such features can be derived from them. Further, because human fingers vary in their anatomical composition, their acoustic and touch properties can vary between humans. Moreover, the way users touch a touch screen can also be distinguishing (e.g., what finger, what part of the finger, how flat, how hard). Thus, the vibro-acoustic features and touch features contain properties that can be characteristic of different users.

It is therefore possible to include a classifier in a computing system configured with a touch screen that upon receipt of a touch event, makes a determination about which user is operating the computing system or whether the user is authorized or has any personalized features. Any single event may not yield sufficient confidence as to identifying which user is operating the device. Therefore the classifier may withhold a conclusion until a sufficient level of confidence is reached, or a best guess can be forced at a predetermined period or event (e.g., after 10 touches, after 2 minutes, when entering a privileged application).

For some embodiments, the classifier may include a sensing system configured to continuously samples vibro-acoustic data and saving it into a buffer. The buffer can be of many lengths such as, for example, 50 milliseconds. The classifier may be coupled with a touch screen (or touch sensitive surface) configured to wait for a touch event to occur. Any number of touch technologies are possible for the touch screen. When the touch screen detects a touch event, it triggers a conversion, feature extraction, and classification process.

When the touch event is detected, data from the vibro-acoustic buffer is retrieved. Because the touch screen may have some latency, it is often necessary to look backwards in the buffer to find the vibro-acoustic waveform that corresponds to the touch impact (e.g., if the touch screen has a 20 ms latency, it may be necessary to look back in the buffer 20 ms to find the corresponding vibro-acoustic event). All or part of the buffer may be saved and passed to the next process.

The waveform from the sensor is a time-domain representation of the vibro-acoustic signal. During conversion, the signal is converted into other forms. This includes filtering the waveform and transforming into other forms, including frequency domain representations. During extraction, touch screen controller data and vibro-acoustic data are analyzed, and features that characterize different users are extracted. For the vibro-acoustic data, features are computed for all representations of the signal. These features are then passed to the classifier, which uses the information to label the touch event with a user (in addition to whatever the touch sensitive surface reports, e.g., X/Y position, major/minor axes, pressure, etc.) The augmented touch event may then be passed to the operating system (OS) or end user applications, to associate a user based on the touch event.

FIG. 1 is a block diagram of a computing system 10 for distinguishing among different users based on a classification of vibro-acoustic signals, in accordance with an embodiment of the invention. The computing system 10 of the embodiment may have an OS, and can run various types of services or applications, known as apps. The computing system 10 may also be equipped with a telecommunication capability that can allow connections to a communications network. Such a computing system may include, but not be limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 1, the computing system 10 may include a touch screen 100, a touch event detector 110, a vibro-acoustic classifier 120 and an OS 130. The touch event detector 110 may be associated with one or more sensors. The one or more sensors may be mounted at any number of locations inside the computing system 10, including but not limited to a chassis, touch screen, mainboard, PCB, display, panel and enclosure.

When a user uses a finger to touch a surface of the touch screen 100, the touch event produces a vibro-acoustic response in the air and also mechanical vibrations inside the contacting surface (e.g., touch screen, enclosure, device chassis). Some embodiments of the present invention may utilize both sources of vibro-acoustic signal with one or more sensors (e.g., one for in-air acoustics, and one for mechanical vibrations, also referred to as structural acoustics). Several sensor types can be used including, for example, Piezo bender elements, Piezo film, Accelerometers (e.g., linear variable differential transformer (LVDT), Potentiometric, Variable Reluctance, Piezoelectric, Piezoresistive, Capacitive, Servo (Force Balance), MEMS, Displacement sensors, Velocity sensors, Vibration sensors, Gyroscopes, Proximity Sensors, Electric mics, Hydrophones, Condenser microphone, Electret condenser microphone, Dynamic microphone, Ribbon microphone, Carbon microphone, Piezoelectric microphone, Fiber optic microphone, Laser microphone, Liquid microphone, MEMS microphone.

Many touch screen computing systems have microphones and accelerometers built in (e.g., for voice and input sensing). These can be utilized without the need for additional sensors, or can work in concert with specialized sensors.

The sensor may capture a waveform, which is a time-domain representation of the vibro-acoustic signal. The signal may be converted into other forms. This includes filtering the waveform (e.g., kalman filter, exponential moving average, 2 kHz high pass filter, one euro filter, savitzky-golay filter). It also includes transformation into other representations (e.g., wavelet transform, derivative), including frequency domain representations (e.g., spectral plot, periodogram, method of averaged periodograms, Fourier transform, least-squares spectral analysis, Welch's method, discrete cosine transform (DCT), fast folding algorithm).

The availability of the following touch features depends on the touch screen technology used. A classifier can use none, some or all of these features. These features may include location of touch contact (2D, or 3D in the case of curved glass or other non-planar geometry), size of touch contact (some touch technologies provide an ellipse of the touch contact with major and minor axes), rotation of the touch contact, surface area of the touch contact (e.g., in squared mm or pixels), pressure of touch (available on some touch systems), shear of touch ("shear stress (also called "tangential force" in the literature) arises from a force vector perpendicular to the surface normal of a touch screen. This may be similar to normal stress—what is commonly called pressure—which arises from a force vector parallel to the surface normal"), number of touch contacts, capacitance of touch (if using a capacitive touch screen), swept frequency capacitance of touch (if using a swept frequency6 capacitive touch screen), swept frequency impedance of touch (if using a swept frequency capacitive touch screen), shape of touch (some touch technologies can provide the actual shape of the touch, and not just a circle or ellipse), image of the hand pose (as imaged by e.g., an optical sensor, diffuse illuminated surface with camera, near-range capacitive sensing). It may be noted that the computation phase may also compute the derivative of one or more of the above features over a short period of time, for example, touch velocity and pressure velocity.

For some embodiments, the time domain and frequency domain representations of the signal, including 1st, 2nd and 3rd order derivatives of such representations may be used as features. For some embodiments, filtered versions of the time domain and frequency domain representations and the 1st, 2nd and 3rd order derivatives of such filtered versions may also be used as features.

The following features may be computed on time domain and frequency domain representations of the signal, including 1st, 2nd and 3rd order derivatives of such representations, and further, filtered versions of the time domain and frequency domain representations and the 1st, 2nd and 3rd order derivatives of such filtered versions: average, standard deviation, standard deviation (normalized by overall amplitude), variance, skewness, kurtosis, sum, absolute sum, root mean square (RMS), crest factor, dispersion, entropy, power sum, center of mass, coefficient of variation, cross correlation (i.e., sliding dot product), zero-crossings, seasonality (i.e., cyclic variation), and DC Bias. Template match scores for a set of known exemplar signals may be performed using the following methods: convolution, inverse filter matching technique, sum-squared difference (SSD), dynamic time warping, and elastic matching.

The following features may be computed on frequency domain representations, including 1st, 2nd and 3rd order derivatives of such representations, and further, filtered versions of the frequency domain representations and the 1st, 2nd and 3rd order derivatives of such filtered versions: spectral centroid, spectral density, spherical harmonics, total average spectral energy, band energy ratio (e.g., for every octave), log spectral band ratios (e.g., for every pair of octaves, and ever pair of thirds), additional vibro-acoustic features, linear prediction-based cepstral coefficients (LPCC), perceptual linear prediction (PLP), cepstral coefficients, cepstrum coefficients, mel-frequency cepstral coefficients (MFCC), and frequency phases (e.g., as generated by an FFT).

For some embodiments, all of the above features may be computed on the content of the entire buffer (e.g., 1 ms), and are also computed for sub regions (e.g., around the peak of the waveform, the end of the waveform). For some embodiments, all of the above vibro-acoustic features may be combined to form hybrid features such as, for example, a ratio (e.g., zero-crossings/spectral centroid) or difference (zero-crossings—spectral centroid).

The classification engine may use any number of approaches, including but not limited to basic heuristics, decision trees, Support Vector Machine, Random Forest, Naïve bayes, elastic matching, dynamic time warping, template matching, k-means clustering, K-nearest neighbors algorithm, neural network, Multilayer perceptron, multinomial logistic regression, Gaussian mixture models, and AdaBoost.

For some embodiments, it may be possible to combine results from several different classifiers, for example, through voting scheme. It may also be possible to use different classifiers based on one or more features. For example, two classifiers may be employed, one for processing sensor waveforms with a high Standard Deviation, and another classifier for waveforms with low Standard Deviation.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, including the conventional tip of the finger, causes the OS 130 to activate the application or service related to the interactive elements appropriate to the identified user. Fingers are diverse appendages, both in their motor capabilities and their anatomical compositions. Different users' fingers have different vibro-acoustic properties due to differences in bone density, fleshiness, skin quality, BMI and the like. A single digit contains different parts such as one or more knuckles, a tip, pad and fingernail. A user who tends to use the same finger part when activating a touch screen may add to the likelihood of a correct user identification.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail may encompass all parts of the keratin (or artificial nail material), horn-like envelope covering the dorsal aspect of the terminal phalanges of fingers. The knuckle may include the immediate areas surrounding the boney joints of human fingers, including joints on the thumb, and both major and minor knuckles. The boney regions may be within a 1 cm radius surrounding the metacarpophalangeal joints and interphalangeal articulations.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when one or more fingers touch or contact the surface of the touch screen 100, vibro-acoustic responses are produced. The vibro-acoustic characteristics of the respective user fingers and their respective unique anatomical characteristics produce unique responses for each user.

Referring back to FIG. 1, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone a piezoelectric microphone, MEMS microphone and the like. Once the vibro-acoustic signal has been captured by the touch event detector 110, the vibro-acoustic classifier 120 processes the vibro-acoustic signal to distinguish which user activated the touch screen.

The OS 130 runs the computing system so that the function can be activated in line with the classification of the vibro-acoustic signals and the corresponding user. The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify each user using the above-described features to distinguish among multiple users.

The segmentation unit 122 may be configured to sample the vibro-acoustic signal, for example, at a sampling rate of 96 kHz, using a sliding window of 4096 samples of the vibro-acoustic signal. The conversion unit 124 may be configured to perform, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may be configured to down-sample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may be configured to calculate a series of features from the frequency domain representation of the vibro-acoustic signals, such as the fundamental frequency of the impact waveform. The classification unit 128 may be configured to classify the vibro-acoustic signal using the features to distinguish what user generated the touch event, so that the computing system may selectively activate a function related to the identified user depending on the classified vibro-acoustic signals. To aid the classification operation, a user can provide supplemental training samples to the vibro-acoustic classifier 120. For some embodiments, the classification unit 128 may be implemented with a support vector machine (SVM) for feature classification. The SVM is a supervised learning model with associated learning algorithms that analyze data and recognize patterns, used for classification and regression analysis.

Figure 2A:
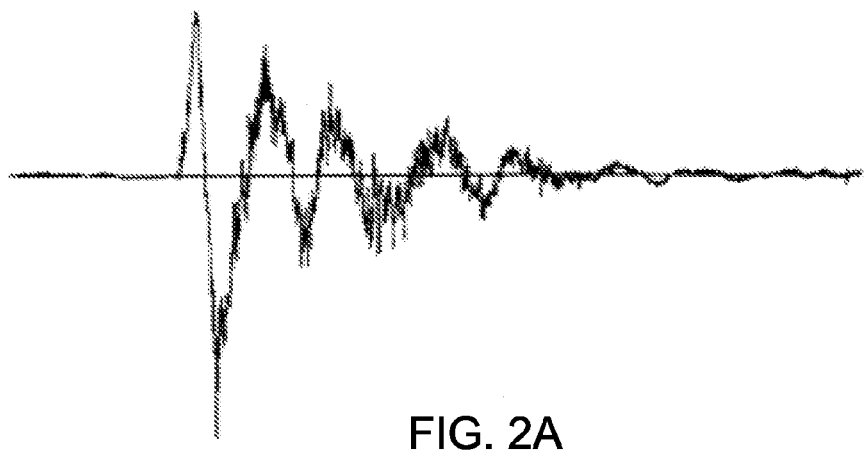
FIG. 2A is a graph of a waveform signal of a first user, showing a time domain signal generated by a touch screen event of the first user, in accordance with an exemplary embodiment of the invention.
Figure 2B:
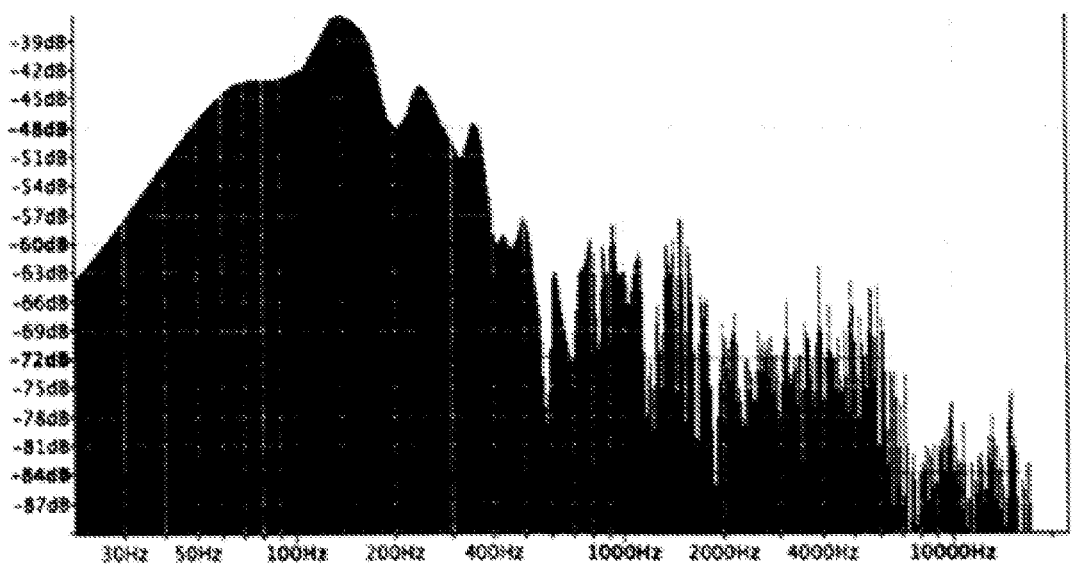
FIG. 2B is a converted waveform signal of the first user comprising the frequency spectrum of the waveform signal of FIG. 2A, in accordance with an exemplary embodiment of the invention.
Figure 3A:
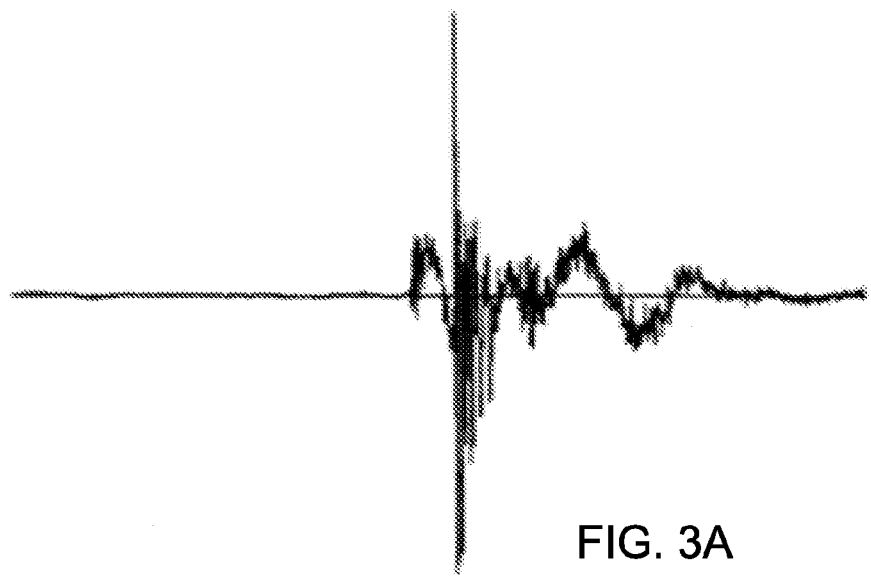
FIG. 3A is a graph of a waveform signal of a second user, showing a time domain signal generated by a touch screen event of the second user, in accordance with an exemplary embodiment of the invention.
Figure 3B:
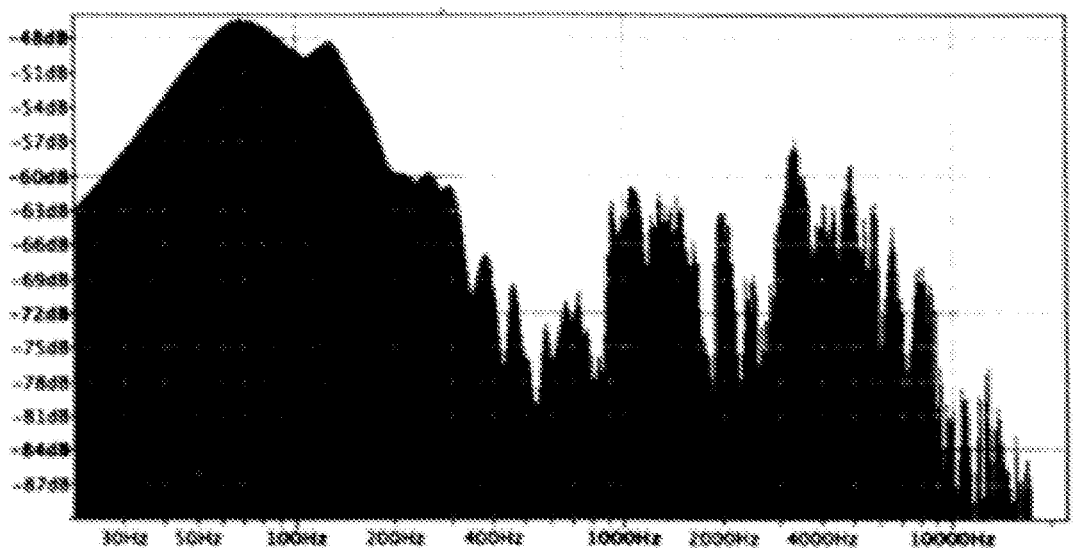
FIG. 3B is a converted waveform signal of the second user comprising the frequency spectrum of the waveform signal of FIG. 3A, in accordance with an exemplary embodiment of the invention.

FIGS. 2A and 2B illustrate an exemplary waveform signal and corresponding frequency spectrum of a touch event of a first user. FIGS. 3A and 3B illustrate an exemplary waveform signal and corresponding frequency spectrum of a touch event of a second user, different from the first user. The differences in waveforms associated with the first user and with the second user as illustrated in FIGS. 2A and 2B versus FIGS. 3A and 3B are typical for different users activating a touch screen in different impact actions.

Figure 4:
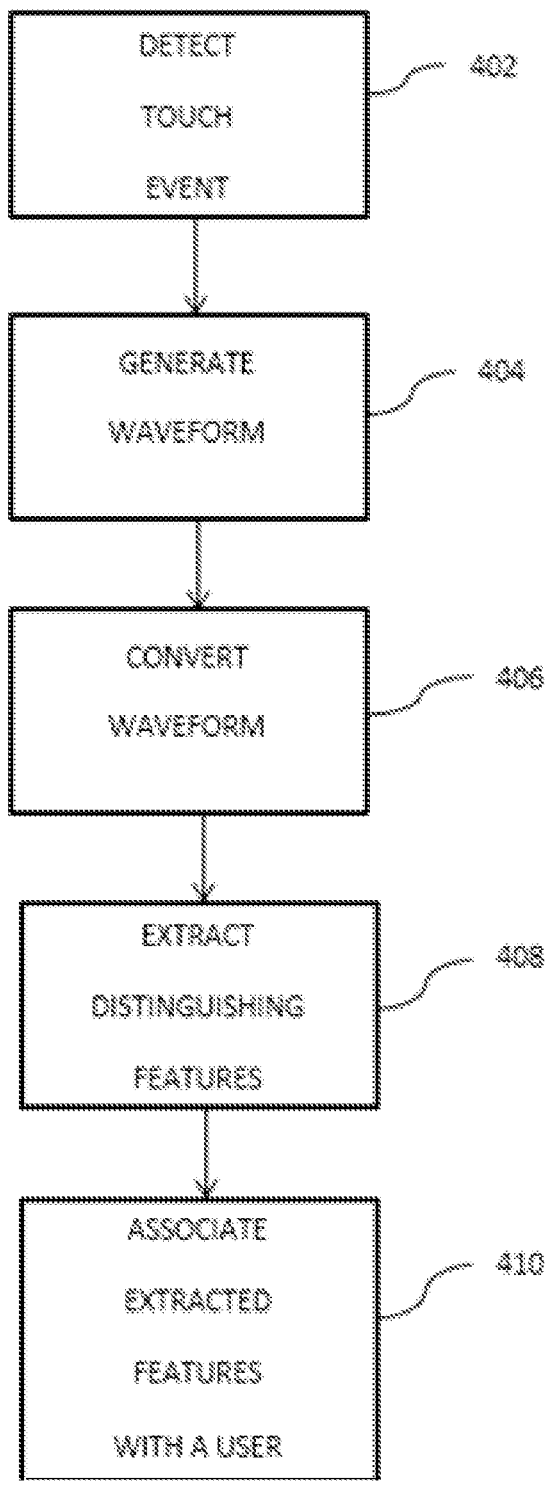
FIG. 4 is a flow diagram illustrating a process that may be performed to differentiate touch screen users, in accordance with an exemplary embodiment of the invention.

FIG. 4 is a flow diagram illustrating a process that may be performed to differentiate touch screen users, in accordance with an exemplary embodiment of the invention. As shown in block 402, when a user touches a touch screen, a touch event is detected. The touch event entailing the vibro-acoustic signal. At block 404, a waveform is generated based on detection of the touch event in block 402. At block 406, the waveform generated in block 404 is converted into another form. At block 408, distinguishing features are extracted. At block 410, the extracted features are associated with a particular user. In a common architecture, the data storage in which the algorithm for executing or assisting with execution of the operations shown in FIG. 4 includes a machine-readable medium which stores the main body of instructions (e.g., software). The instructions may also reside, completely or at least partially, within a memory or within a processor (e.g., within a processor's cache memory) of a host device (e.g. a cell phone, kiosk, or a laptop computer) during execution. The memory and the processor also constitute machine-readable media.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

The invention claimed is:

1. An apparatus for differentiating touch screen users based on characterization of features derived from the touch event acoustics and mechanical impact, the apparatus comprising:
   a touch sensitive surface for detecting a touch event from at least one user;
   at least one sensor generating a vibro-acoustic waveform signal from such touch event;
   a converter for converting the waveform signal into at least a domain signal;
   a feature extractor for extracting distinguishing features from said domain signal; and
   a classification unit which uses the distinguishing features of said extractor to associate the features of the domain signal with a particular user.

2. The apparatus recited in claim 1 wherein said at least one sensor detects an acoustic effect of a touch event.

3. The apparatus recited in claim 1 wherein said at least one sensor detects a mechanical impact effect of a touch event.

4. The apparatus recited in claim 1 wherein said domain signal is a time domain signal.

5. The apparatus recited in claim 1 wherein said domain signal is a frequency domain signal.

6. The apparatus recited in claim 1 wherein said distinguishing features depend at least in part on the physical characteristics of a finger used to create a touch event.

7. The apparatus recited in claim 1 wherein said distinguishing features depend at least in part on the magnitude of the impact used to create a touch event.

8. The apparatus recited in claim 1 wherein said at least one sensor detects mechanical vibrations initiated by said touch event.

9. The apparatus recited in claim 1 wherein said at least one sensor comprises a sensor taken from the group of sensors consisting of impact sensors, vibration sensors, accelerometers, strain gauges, piezo-electric devices and acoustic sensors.

10. The apparatus recited in claim 1 wherein said distinguishing features are extracted based on at least one computation of a characteristic taken from the group consisting of average, standard deviation, variance, skewness, kurtosis, sum, root mean square, crest factor, dispersion, entropy, power sum, center of mass, coefficient of variation, cross-correlation, zero-crossings, seasonality, DC bias, spectral centroid, spectral density, spherical harmonics, spectral energy, band energy ratio, by spectral band ratios, cepstral coefficients and fast Fourier transform content.

11. A computer-implemented method for differentiating touch screen users based on characterization of features derived from the touch event acoustics and mechanical impact, the method comprising the following steps:
   detecting a touch event on a touch sensitive surface;
   generating a vibro-acoustic waveform signal using at least one sensor detecting such touch event;
   converting the waveform signal into at least a domain signal;
   extracting distinguishing features from said domain signal; and
   classifying said features to associate the features of the domain signal with a particular user.

12. The method recited in claim 11 wherein said generating step uses said at least one sensor for detecting an acoustic effect of a touch event.

13. The method recited in claim 11 wherein said generating step uses said at least one sensor for detecting a mechanical impact effect of a touch event.

14. The method recited in claim 11 wherein said domain signal is a time domain signal.

15. The method recited in claim 11 wherein said domain signal is a frequency domain signal.

16. The method recited in claim 11 wherein said distinguishing features depend at least in part on the physical characteristics of a finger used to create a touch event.

17. The method recited in claim 11 wherein said distinguishing features depend at least in part on the magnitude of the impact used to create a touch event.

18. The method recited in claim 11 wherein said at least one sensor detects mechanical vibrations initiated by said touch event.

19. The method recited in claim 11 wherein said at least one sensor comprises a sensor taken from the group of sensors consisting of impact sensors, vibration sensors, accelerometers, strain gauges, piezo-electric devices and acoustic sensors.

20. The method recited in claim 11 wherein said distinguishing features are extracted based on at least one computation of a characteristic taken from the group consisting of average, standard, deviation, variance, skewness, kurtosis, sum, root mean square, crest factor, dispersion, entropy, power sum, center of mass, coefficient variation, cross-correlation, zero-crossings, seasonality, DC bias, spectral centroid, spectral density, spherical harmonics, spectral energy, band energy ratio, log spectral band ratios, cepstral coefficients and fast Fourier transform content.

21. A non-transitory computer readable medium containing instructions for using detected touch screen events to associate particular users with such events, wherein execution of the program instructions by a processor causes the processor to carry out the steps of:

generating a vibro-acoustic waveform signal using at least one sensor detecting such touch event;

converting the waveform signal into at least a domain signal;

extracting distinguishing features from said converted waveform signal; and classifying said features to associate the features of the domain signal with a particular user.

\* \* \* \* \*